(12) United States Patent
Walters et al.

(10) Patent No.: US 12,473,241 B2
(45) Date of Patent: Nov. 18, 2025

(54) COMPOST LEACHATE DISTRIBUTION DEVICES

(71) Applicant: EXEL INDUSTRIES, Epernay (FR)

(72) Inventors: George Walters, Birmingham (GB); Robert Boughton, Birmingham (GB)

(73) Assignee: EXEL INDUSTRIES, Epernay (FR)

( * ) Notice: Subject to any disclaimer, the term of this patent is extended or adjusted under 35 U.S.C. 154(b) by 943 days.

(21) Appl. No.: 17/651,154

(22) Filed: Feb. 15, 2022

(65) Prior Publication Data
US 2022/0267226 A1 Aug. 25, 2022

(30) Foreign Application Priority Data
Feb. 22, 2021 (GB) .................................... 2102513

(51) Int. Cl.
| | | |
|---|---|---|
| C05F 17/986 | (2020.01) | |
| C05F 17/70 | (2020.01) | |
| C05F 17/914 | (2020.01) | |
| C05F 17/921 | (2020.01) | |
| C05F 17/929 | (2020.01) | |

(52) U.S. Cl.
CPC ............ *C05F 17/986* (2020.01); *C05F 17/70* (2020.01); *C05F 17/914* (2020.01); *C05F 17/929* (2020.01); *C05F 17/939* (2020.01)

(58) Field of Classification Search
CPC ...... C05F 17/986; C05F 17/70; C05F 17/914; C05F 17/939; C05F 17/929
USPC ...................................................... 435/290.1
See application file for complete search history.

(56) References Cited

U.S. PATENT DOCUMENTS

| | | |
|---|---|---|
| 5,300,438 A | 4/1994 | Augspurger et al. |
| 7,611,891 B2 | 11/2009 | Sundberg |
| 7,625,749 B2 | 12/2009 | Sundberg |
| 2002/0090718 A1 | 7/2002 | Chen et al. |
| 2006/0172411 A1* | 8/2006 | Gamlin .................. A01K 67/33 435/290.3 |

(Continued)

FOREIGN PATENT DOCUMENTS

| | | | |
|---|---|---|---|
| CA | 2287672 A1 * | 4/2001 | ............ C05F 17/907 |
| CN | 201280519 Y | 7/2009 | |

(Continued)

OTHER PUBLICATIONS

CN-208776359-U Machine English Translation (Year: 2019).*

(Continued)

*Primary Examiner* — Michael L Hobbs
*Assistant Examiner* — Lenora A Abel
(74) *Attorney, Agent, or Firm* — Heslin Rothenberg Farley & Mesiti P.C.

(57) ABSTRACT

A compost leachate distribution device includes a composting chamber for receiving material to be composted and a leachate collection chamber for collecting, via a leachate fluid path, leachate generated during composting in the composting chamber. The device has a leachate mixing arrangement a first inlet for receiving a flow of water, a mixing chamber to which the first inlet leads for mixing water with leachate to form a water/leachate mix and an outlet leading from the mixing chamber to the exterior for exit of the water/leachate mix, wherein the leachate mixing arrangement has dosing means for controlling a rate of flow of leachate from the leachate collection chamber into the mixing chamber.

18 Claims, 4 Drawing Sheets

(56) References Cited

U.S. PATENT DOCUMENTS

2020/0239379 A1    7/2020  Mcadoo

FOREIGN PATENT DOCUMENTS

| | | | |
|---|---|---|---|
| CN | 103111214 A | | 5/2013 |
| CN | 109293407 A | | 2/2019 |
| CN | 208776359 U | * | 4/2019 |
| WO | 2022067384 A1 | | 4/2022 |

OTHER PUBLICATIONS

UKIPO Search Report dated Aug. 23, 2021 (1 p.).
The Envirocycle Composter, the compost gardener.com, dated Feb. 23, 2021, 6 pp.
UK Examination Report based on GB2102513.5, dated Sep. 24, 2024, 2 pagees.
Beijing Huisi Chengye Intellectual Property Agency Co., State Intellectual Property Office Search Report, 6 pages.

* cited by examiner

COMPOST LEACHATE DISTRIBUTION DEVICES

CROSS REFERENCE TO RELATED APPLICATIONS

This application claims priority from Great Britain Patent Application No. 2102513.5 filed on Feb. 22, 2021, the entire disclosure of which is incorporated herein by reference.

This invention relates to compost leachate distribution devices.

In the art, it is known to provide composters to receive and collect material to be composted. These composters are provided with an aperture for accessing the inner part of the composter so that the user can load the composter with material to be composted and/or unload solid compost.

During the composting process, leachate can be produced. Leachate is liquid that seeps from the decomposing organic material and can be rich in nutrients. This can be useful as a weedkilling substance and/or a fertilizer.

Typically in existing composters users make use only of the solid compost and the leachate is a waste product. Thus, in such a case, the leachate is a secondary product which is allowed to seep away or needs to be disposed of. Even if leachate is recognised as useful there is no convenient way provided to make use of it in existing composters.

Thus, it would be desirable to provide an improved system for collecting, mixing, and distributing leachate allowing the user to efficiently make use of this product of composting material.

According to a first aspect of the present invention, there is provided a compost leachate distribution device comprising a composting chamber for receiving material to be composted, a leachate collection chamber for collecting, via a leachate fluid path, leachate generated during composting in the composting chamber and a leachate mixing arrangement comprising a first inlet for receiving a flow of water, a mixing chamber to which the first inlet leads for mixing water with leachate to form a water/leachate mix and an outlet leading from the mixing chamber to the exterior for exit of the water/leachate mix, wherein the leachate mixing arrangement comprises dosing means for controlling a rate of flow of leachate from the leachate collection chamber into the mixing chamber.

This can provide a compact and efficient system for the generation, collection and distribution of compost leachate which can be useful as a fertilizer and/or a weed treatment.

The compost leachate distribution device may comprise a base for supporting the composting chamber. The composting chamber may be arranged as a drum which may be rotated about its axis for tumbling its contents. The base may be arranged for supporting the composting chamber for rotation about an axis of the composting chamber.

The base may comprise a leachate chamber receiving location for receiving the leachate collection chamber during the collection of compost leachate. This can help lead to a compact design The leachate collection chamber may be removably receivable in the receiving location. This can facilitate removal of the leachate collection chamber for say cleaning or for use when distributing collected leachate.

In some cases the device may be usable/used so as to distribute leachate when the leachate collection chamber is received in the receiving location. In some cases the device may be usable/used so as to distribute leachate when the leachate collection chamber is removed from the receiving location. In some cases both are possible/practical options.

The base may comprise two leg portions and the leachate chamber receiving location may be provided between the two leg portions.

The two leg portions may be held in position relative to one another by at least one pair of connecting rods. The connecting rods may be tubular.

The base may comprise at least one roller for supporting the compost chamber for rotation about the axis of the compost chamber.

The compost leachate distribution device may comprise a leachate collection bottle which defines the leachate collection chamber.

According to another aspect of the present invention there is provided a leachate collection bottle arranged for use as part of a compost leachate distribution device as defined above, which bottle defines the leachate collection chamber.

The leachate collection bottle may comprise the leachate mixing arrangement.

The leachate collection bottle may be removably receivable in the leachate chamber receiving location.

The leachate mixing arrangement may comprise a venturi mixing tube provided between the first inlet and the outlet of the mixing chamber and a dip tube providing a fluid path from the leachate collection chamber to the venturi mixing tube, wherein the venturi mixing tube and the dip tube act as said dosing means.

It will be appreciated that as water flows through the venturi tube pressure in a constriction of the venturi will reduce which will serve to suck fluid out of the leachate collection chamber. Moreover, the dimension and arrangement of the venturi and the drip tube may be selected to give a desired dosing rate.

The leachate collection bottle may comprise a leachate drip collection tray portion provided on an outer wall of the bottle.

The leachate drip collection tray portion may comprise a recess provided in the outer wall of the bottle.

The leachate drip collection tray portion may comprise an inlet port for allowing collected leachate to enter into the leachate collection chamber from the collection tray.

A removable inlet port blanking plug may be provided. This may be for sealing the inlet port when leachate is not being collected, for example when the bottle is being used for distributing (diluted) leachate.

The leachate drip collection tray portion may be arranged for guiding liquid towards the inlet port. A base of the tray portion may slope towards the inlet port. A base of the tray portion may have one of more projections or grooves for guiding liquid towards the inlet port.

The tray portion may have an outer rim and the base of the tray portion may be inclined in relation to the outer rim towards the inlet port.

The tray portion may be provided on a side of the bottle which is arranged to face upwards towards the composting chamber when the bottle is laying on an opposite side in the leachate chamber receiving location.

A hose connector fitting may be provided for connection to the inlet port. This can facilitate the connection of a hose to the inlet port for use in washing out the leachate collection chamber.

The inlet port may comprise a threaded connection portion for receiving the blanking plug and/or the hose connector fitting.

The leachate mixing arrangement may comprise a valve for changing the state of the mixing arrangement from an "off" state where water entering the first inlet is blocked from reaching the outlet and "on" state where water entering the first inlet can pass to the outlet.

The leachate collection bottle may comprise a handle. This may be for assisting in removing the leachate collection bottle from the receiving location and/or for assisting in carrying the leachate collection bottle.

The handle may comprise inlet port component receiving location for holding, whilst not in use, at least one of a blanking plug and/or a hose connector fitting which are provided for selective connection to the inlet port.

The compost chamber may comprise an openable door portion for facilitating the loading of material to be composted into the chamber.

The door portion may be hingedly mounted on a wall portion of the compost chamber. Where the compost chamber is arranged as a drum, the door portion may be provided in a generally cylindrical wall of the drum.

A lock may be provided for locking the door portion in a closed position for normal operation—say for tumbling operation.

At least one vent portion may be provided on a wall portion of the compost chamber. The at least one vent portion may be controllable to control the amount of venting which is provided. In one set of embodiments, the vent portion comprises a moveably mounted cover portion provided with at least one aperture, the cover portion being moveable mounted on and relative to the respective wall portion in which is provided with at least one corresponding aperture, wherein the degree of venting is variable in dependence on the amount by which the apertures in the wall portion and in the cover portion align with one another.

The moveably mounted cover portion may comprise a pivotally or rotatably mounted portion, which may be a disc. The moveably mounted cover portion may be accommodated in a recess provided in the outer wall of the compost chamber.

The compost chamber may comprise at least one outlet aperture for allowing the escape of leachate from the compost chamber.

The at least one outlet aperture may be arranged to supply leachate to the leachate collection chamber when received in the leachate collection chamber receiving location.

The compost chamber may comprise a housing made of at least two parts with a respective join line between the at least two parts. The at least one outlet aperture may be defined at said join line.

This can avoid opening an aperture in the material of the housing parts to allow the escape of leachate. This can aid manufacture and avoid creating a weakness in the housing at a location which may be under significant stress in use.

The at least one outlet aperture may be spaced away from the door portion. The at least one outlet aperture may be provided towards the bottom of the compost chamber when the compost chamber is in a resting orientation.

Where the compost chamber is arranged as a drum the at least one outlet aperture may be provided within a region defined by one half of the drum, preferably within a region defined by one quarter of the drum. Thus the drum may have a resting orientation in which the at least one outlet aperture is towards the bottom of the drum and where present the door portion is towards the top of the drum.

Where the compost chamber is arranged as a drum the at least one outlet aperture may be provided in the generally cylindrical side wall of the compost chamber.

A groove may be provided in an outside surface of the generally cylindrical side wall of the compost chamber and the at least one outlet aperture may be provided in said groove, say in the base of the groove.

This can encourage leachate that leaves the drum to run in the groove to a lowermost part of the drum in use. From this location the leachate may tend to drip, and where present be collected in the drip tray of the leachate bottle.

If the at least one outlet aperture is confined to a limited range of the circumference of the drum—say one half or one quarter of the drum, then the drum may be rotated to a "non-leaking" orientation when the leachate bottle is not in place.

According to another aspect of the present invention there is provided a composter drum arranged for use as part of a compost leachate distribution device as defined above, which drum defines the composting chamber.

According to another aspect of the present invention there is provided a composter drum and base arrangement arranged for use as part of a compost leachate distribution device as defined above, which drum defines the composting chamber and which base supports the drum.

According to another aspect of the present invention, there is provided a garden irrigation system which comprises a compost leachate distribution device as defined above and a length of hose for connection to a water supply and connected to the inlet of the composting leachate distribution device for distributing water/leachate mix away from the composting leachate distribution device.

A second length hose and/or an outlet device, such as a hose gun, may be connected to the outlet of the compost leachate distribution device.

Note that, in general terms and with any necessary modifications in wording, all of the further features defined above following any aspect of the invention above are applicable as further features of all other aspects of the invention defined above. These further features are not restated after each aspect of the invention merely for the sake of brevity.

Embodiments of the present invention will now be described, by way of example only, with reference to the accompanying drawings in which.

Figure 1:
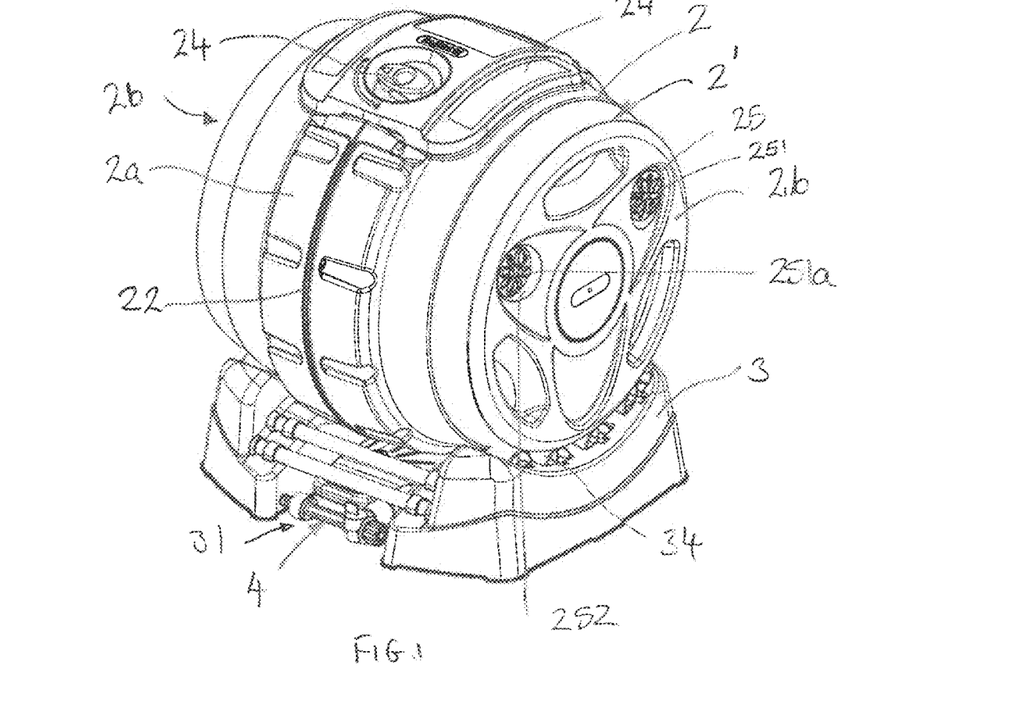
FIG. 1 schematically shows a perspective view of a compost leachate distribution device.
Figure 2:
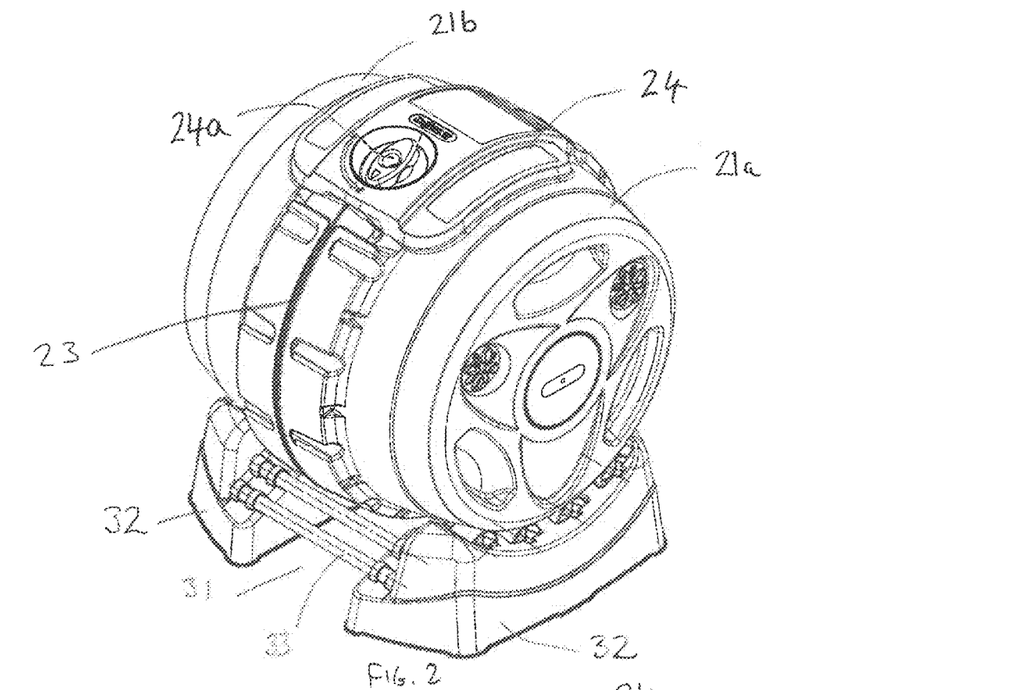
FIG. 2 schematically shows a perspective view of the compost leachate distribution device of FIG. 1 but without a leachate collection bottle in position.
Figure 3:
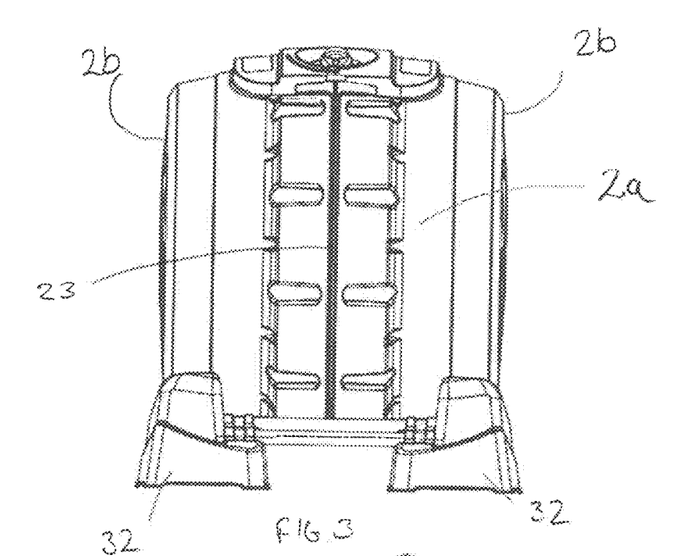
FIG. 3 schematically shows a front view of the compost leachate distribution device of FIG. 1 but without the leachate collection bottle in position.
Figure 4:
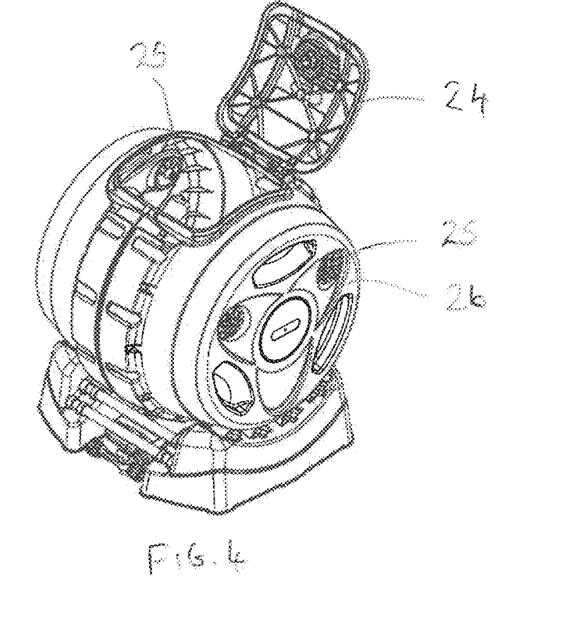
FIG. 4 schematically shows a perspective view of the compost leachate distribution device of FIG. 1 but with a material loading door open.

FIGS. 1 to 4 show a compost leachate distribution device 1 which comprises a composting drum 2, which includes a composting chamber 2', a base 3, and a leachate collection bottle 4. FIGS. 1 and 4 show the leachate collection bottle 4 located in a leachate bottle receiving location 31 defined in the base 3 whilst FIGS. 2 and 3 show the compost leachate distribution device without the leachate receiving bottle 4 in place.

Figure 6:
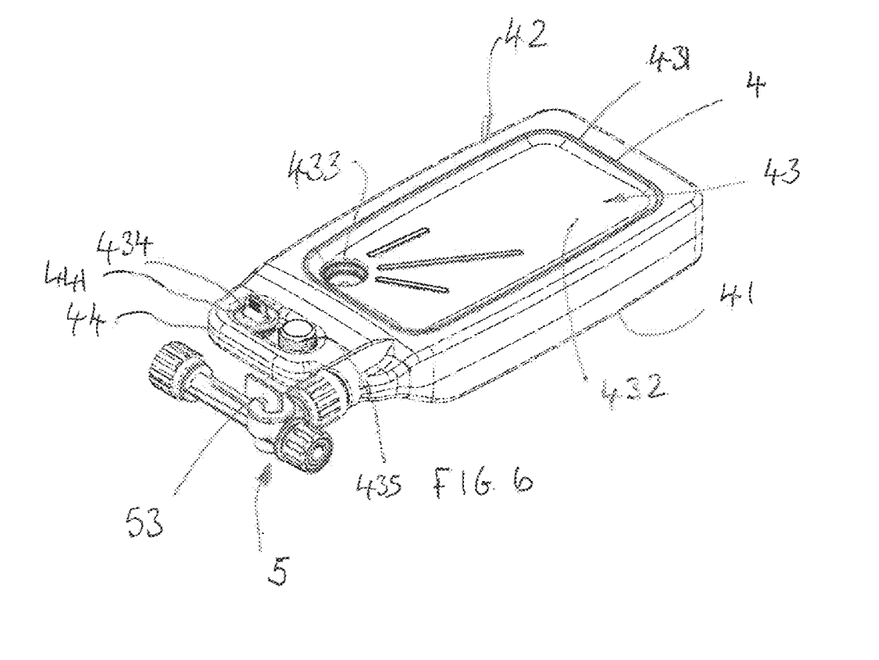
FIG. 6 schematically shows the leachate collection bottle of the compost leachate distribution device of FIG. 1.
Figure 7:
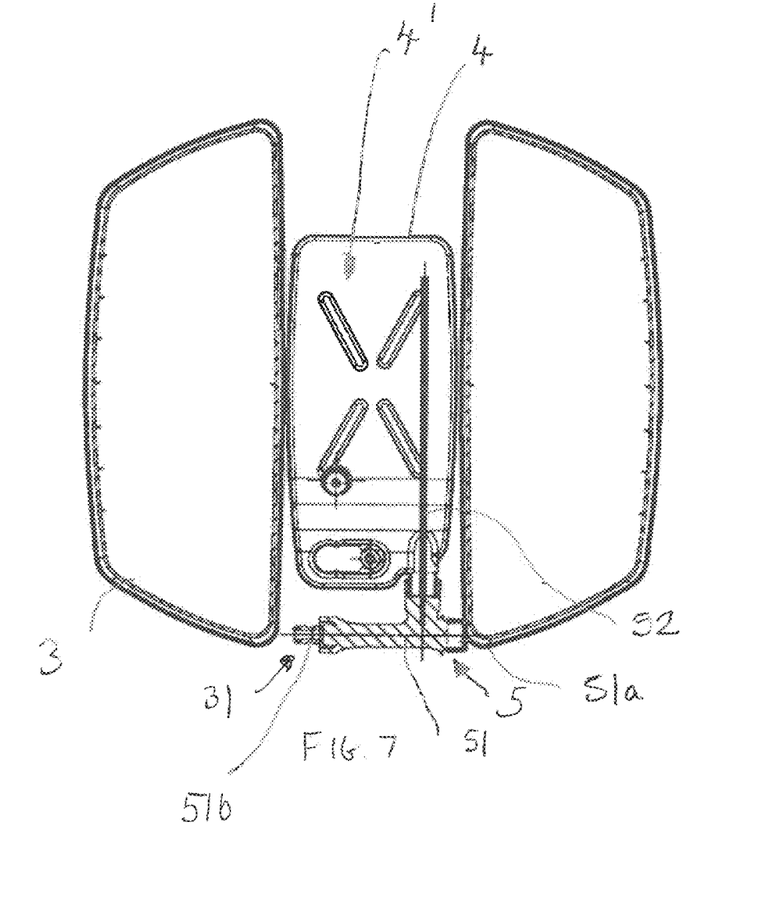
FIG. 7 is a schematic sectional view, looking from above, of the leachate collection bottle and part of a base of the compost leachate distribution device of FIG. 1.

The leachate collection bottle 4 which includes a leachate collection chamber 4' is shown in isolation in FIG. 6 and in section in FIG. 7 whilst in the leachate bottle receiving location 31.

The composting drum 2 is arranged for receiving material to be composted and comprises a housing 21 having two main parts 21*a* and 21*b*. The drum 2 is generally cylindrical having a generally cylindrical surface 2*a* and two generally circular ends 2*b*. Each of the two main parts 21*a*, 21*b* of the housing 21 make up substantially half of this cylinder. The two main parts 21*a*, 21*b* meet at a join line 22 which is midway across the width of the cylinder of the drum 2. On the outer cylindrical surface 2*a* of the drum 2, a groove 23 is formed at the join line 22 which runs around the majority of the drum 2.

The composting drum 2 comprises a door portion 24 which is hingedly mounted to the two main parts 21*a*, 21*b* of the housing. The door portion can be moved between a closed position as shown in FIGS. 1 to 3 and an open position as shown in FIG. 4. The door portion 24 includes a lock 24*a* for locking the door portion in the closed position shown in FIGS. 1 to 3. The door portion 24 can be opened to add material to be composted to the drum 2 and to remove composted material—typically solid composted material.

At least one of the end walls 2*b* of the drum 2, in this embodiment both end walls 2*b* of the drum 2, comprises at least one vent arrangement 25 for venting the interior of the drum 2. In this embodiment each end wall has two vent arrangements 25. Each vent arrangement 25 comprises a rotatably mounted disc element 251 provided with plurality of apertures 251*a*. The disc element 251 is provided in a respective recess 252 provided in the respective end wall 2*b*. The end wall 2*b* is provided with a corresponding set of apertures (not shown), in this case within the recess 252. The disc element 251 and the apertures in the end wall 2*b* are arranged so that as the rotational orientation of the disc element 251 is changed in relation to the end wall 2*b*, the degree to which the two sets of apertures align varies—so varying the venting which is achieved. The vent arrangement 25 may allow movement between a fully closed (not venting) condition to a fully open condition.

The base 3 is arranged for supporting the drum 2 for rotation about the axis of the drum 2 so that contents of the drum 2 may be tumbled from time to time to aid composting. The door portion 24 can be locked closed during such tumbling.

The base 3 has two leg portions 32 between which the leachate bottle receiving location 31 is provided. The two leg portions 32 are held together but in a spaced apart relation by connecting rods 33. Two sets of connecting rods 33 are provided although only one set is visible in the drawings. There are two connecting rods 33 at one end of the base 3—what might be termed the front—as visible in the drawings, and a corresponding set of two connecting rods 33 at the other end of the base 3—what might be termed the back.

Rollers 34 are provided in the base 3 for supporting the drum 2 for rotation. One set of rollers 34 is provided in each leg portion 32. The rollers 34 act on the cylindrical side wall 2*a* of the drum 2 as it is rotated.

Figure 5:
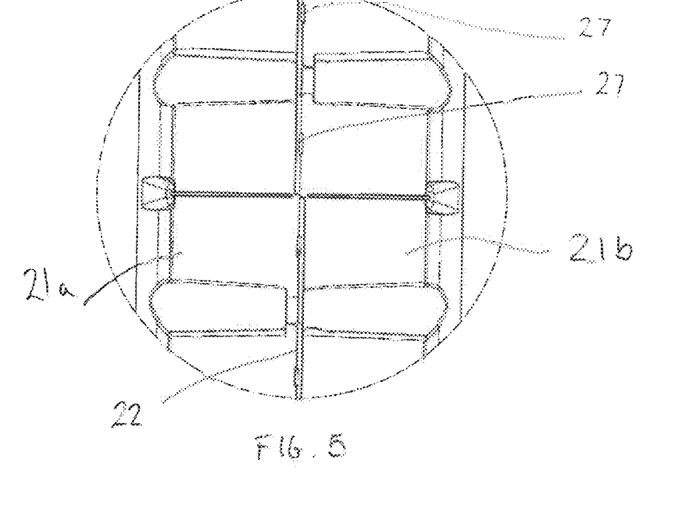
FIG. 5 schematically shows an internal portion of the compost leachate distribution device of FIG. 1.

FIG. 5 shows an inside view of a portion of the drum 2, in particular a portion where the two main parts 21*a*, 21*b* of the housing meet at the join line 22. Leachate escape apertures 27 are formed at the join line 22 in this region of the housing 21. Such apertures 27 are provided only at a lower portion of the drum 2—ie a portion away from the door portion 24 or otherwise a portion which will be lowermost when the drum is in a "rest position"—ie a position adopted between user tumblings of the content. The apertures 27 may be provided over an angle of say 180 degrees, or 90 degrees, or another selected angular ranged around the circumference of the drum 2.

In operation as material composts within the drum 2 and the drum suitably orientated leachate can leak out of the apertures 27 as a part of a leachate fluid path towards the leachate bottle 4 when this is located in the receiving location 31. Note it is apparent to the user that the drum 2 is suitably orientated when the door portion 24 is facing generally upwards—ie facing above horizontally.

Considering the position from the outside, the apertures 27 are found in the bottom of the groove 23 in the outer curved surface 2*a* of the drum 2. Thus as leachate leaves the interior of the drum 2 it enters into the groove 23 and will tend to run in the groove 23 to the lowermost part of the drum 2 where it may drip towards the leachate bottle 4.

As alluded to above the leachate bottle 4 is shown in more detail in FIGS. 6 and 7. The leachate bottle 4 is arranged to be laid on one side 41 in the receiving location 31. Another side 42 of the leachate bottle 4 comprises a drip collection tray 43 comprising an outer rim 431 and a recessed base 432. The base 432 is inclined relative to the rim 431 towards an inlet port 433 into the leachate collection chamber 4'. Projections 434 are provided on the base 432 to guide liquid towards the inlet port 433. In use drips from the drum 2 fall onto the collection tray 43 and are guided to the inlet port 433.

An inlet port blanking plug 434 and an inlet port hose fitting connector 435—say a male push fit fitting connector—are provided that may be screw fitted into the inlet port 433 to blank it off, or aid in cleaning respectively.

When not is use, the inlet port 433 blanking plug 434 and the inlet port hose fitting connector 435 can be stored in receiving portions 441 of a handle 44 of the leachate bottle 4. The handle 44 is useful for assisting removing the leachate bottle 4 from the receiving location 31 and for holding the leachate bottle in use as will be mentioned below.

The leachate bottle 4 comprises a mixing arrangement 5 for mixing leachate held in the leachate collection chamber 4' with a supply of water so that it may be distributed as desired.

Referring in particular to FIG. 7, the mixing arrangement 5 comprises a venturi mixing tube 51 and a leachate dip tube 52 which projects into the leachate collection chamber 4' and opens into the venturi mixing tube 51. The venturi mixing tube 51 has an inlet 51*a* to which a water supply can be connected and an outlet 51*b* to which a hose or outlet device such as a hose gun may be connected—or which may just be allowed to eject liquid.

In use when a supply of water flows through the venturi mixing tube 51, leachate will tend to be sucked into the flow from the collection chamber 4' at a rate which is determined by the dimension and arrangement of the venturi mixing tube 51 and the dip tube 52. The leachate then mixes with the flow of water so that a water/leachate mix leaves the outlet 51*b*. Thus giving convenient distribution of the leachate.

A valve 53 is provided which can be used to turn off the flow of liquid through the venturi mixing tube 51—That is to say the valve may selectively block or allow flow through the venturi mixing tube 51. In alternatives a similar valve may be provided in addition or in alternative to allow turning on and off of the supply of leachate to the venturi mixing tube 51. That is to say such a valve may selectively block or allow flow in the dip tube 52.

Whilst the leachate bottle 4 can, at least in some cases, be used to distribute leachate whilst in position in the receiving location 31 below the drum 2, more normally it will be used away from the receiving location 31. In such a case, typically, the blanking plug 434 will be fitted in the inlet port 433 and the bottle 4 used in an upright orientation. The bottle 4 can then conveniently be held by the handle 44 or by an attached output device etc—say a hose gun as a user desires.

The invention claimed is:

1. A compost leachate distribution device comprising a composting chamber for receiving material to be composted, a leachate collection chamber for collecting, via a leachate fluid path, leachate generated during composting in the composting chamber and a leachate mixing arrangement comprising a first inlet for receiving a flow of water, a mixing chamber to which the first inlet leads for mixing water with leachate to form a water/leachate mix and an outlet leading from the mixing chamber to the exterior for exit of the water/leachate mix, wherein the leachate mixing arrangement comprises a dosing arrangement for controlling a rate of flow of leachate from the leachate collection chamber into the mixing chamber, wherein the leachate mixing arrangement comprises a venturi mixing tube provided between the first inlet and the outlet of the mixing chamber and a dip tube providing a fluid path from the leachate collection chamber to the venturi mixing tube, wherein the venturi mixing tube and the dip tube act as said dosing arrangement.

2. A compost leachate distribution device according to claim 1 which comprises a base for supporting the composting chamber.

3. A compost leachate distribution device according to claim 2 in which the composting chamber is arranged as a drum and the base is arranged for supporting the composting chamber for rotation about an axis of the composting chamber.

4. A compost leachate distribution device according to claim 2 in which the base comprises a leachate chamber receiving location for receiving the leachate collection chamber during the collection of compost leachate.

5. A compost leachate distribution device according to claim 4 in which the leachate collection chamber is removably receivable in the receiving location.

6. A compost leachate distribution device according to claim 1 in which the compost leachate distribution device comprises a leachate collection bottle which defines the leachate collection chamber.

7. A compost leachate distribution device according to claim 6 in which the leachate collection bottle comprises a leachate drip collection tray portion provided on an outer wall of the bottle.

8. A compost leachate distribution device according to claim 7 in which the leachate drip collection tray portion comprises an inlet port for allowing collected leachate to enter into the leachate collection chamber from the collection tray.

9. A compost leachate distribution device according to claim 8 in which the tray portion has an outer rim and a base of the tray portion is inclined in relation to the outer rim towards the inlet port.

10. A compost leachate distribution device according to claim 1 comprising at least one vent portion provided on a wall portion of the compost chamber, wherein the at least one vent portion is controllable to control the amount of venting which is provided.

11. A compost leachate distribution device according to claim 1 in which the compost chamber comprises at least one outlet aperture for allowing the escape of leachate from the compost chamber.

12. A compost leachate distribution device according to claim 11 in which the compost chamber comprises a housing made of at least two parts with a respective join line between the at least two parts and the at least one outlet aperture being defined at said join line.

13. A compost leachate distribution device according to claim 12 in which a groove is provided in an outside surface of a cylindrical side wall of the compost chamber and the at least one outlet aperture is provided in said groove.

14. A leachate collection bottle arranged for use as part of a compost leachate distribution device according to claim 1, wherein the leachate collection bottle defines the leachate collection chamber.

15. A compost leachate distribution device comprising a composting chamber for receiving material to be composted, a base for supporting the composting chamber, a leachate collection chamber for collecting, via a leachate fluid path, leachate generated during composting in the composting chamber and a leachate mixing arrangement comprising a first inlet for receiving a flow of water, a mixing chamber to which the first inlet leads or mixing water with leachate to form a water/leachate mix and an outlet leading from the mixing chamber to the exterior for exit of the water/leachate mix, wherein the leachate mixing arrangement comprises a dosing arrangement for controlling a rate of flow of leachate from the leachate collection chamber into the mixing chamber, wherein the base comprises a leachate chamber receiving location for receiving the leachate collection chamber during the collection of compost leachate and wherein the leachate collection chamber is removably receivable in the receiving location.

16. A compost leachate distribution device according to claim 15 wherein the compost leachate distribution device comprises a leachate collection bottle which defines the leachate collection chamber and the leachate collection bottle comprises the leachate mixing arrangement.

17. A compost leachate distribution device according to claim 15 wherein the base comprises two leg portions and the leachate chamber receiving location is provided between the two leg portions.

18. A compost leachate distribution device comprising a composting chamber for receiving material to be composted, a leachate collection chamber for collecting, via a leachate fluid path, leachate generated during composting in the composting chamber and a leachate mixing arrangement comprising a first inlet for receiving a flow of water, a mixing chamber to which the first inlet leads for mixing water with leachate to form a water/leachate mix and an outlet leading from the mixing chamber to the exterior for exit of the water/leachate mix, wherein the leachate mixing arrangement comprises a dosing arrangement for controlling a rate of flow of leachate from the leachate collection chamber into the mixing chamber, wherein the compost leachate distribution device comprises a leachate collection bottle which defines the leachate collection chamber, the leachate collection bottle comprises a leachate drip tray portion provided on an outer wall of the leachate collection bottle, the drop collection tray portion comprising an inlet port for allowing collected leachate to enter into the leachate collection chamber from the collection tray, and a removable inlet port blanking plug being provided for sealing the inlet port when leachate is not being collected.

* * * * *